(12) United States Patent
Hosokawa (10) Patent No.: US 7,610,054 B2
(45) Date of Patent: Oct. 27, 2009

(54) MOBILE COMMUNICATION SYSTEM (75) Inventor: Satoshi Hosokawa, Tokyo (JP)

(73) Assignee: NEC Corporation, Tokyo (JP)

( * ) Notice: Subject to any disclaimer, the term of this patent is extended or adjusted under 35 U.S.C. 154(b) by 156 days.

(21) Appl. No.: 10/959,096

(22) Filed: Oct. 7, 2004

(65) Prior Publication Data
US 2005/0054338 A1 Mar. 10, 2005

(30) Foreign Application Priority Data
Oct. 9, 2003 (JP) .............................. 2003-350840

(51) Int. Cl.
H04W 4/00 (2006.01)
(52) U.S. Cl. .................. 455/461; 455/422.1; 455/435.1; 455/456.1
(58) Field of Classification Search .............. 455/414.1, 455/414.2, 435.1
See application file for complete search history.

(56) References Cited

U.S. PATENT DOCUMENTS

| 5,657,373 | A * | 8/1997 | Hermansson et al. | 455/558 |
|---|---|---|---|---|
| 6,212,372 | B1 * | 4/2001 | Julin | 455/418 |
| 6,253,074 | B1 * | 6/2001 | Carlsson et al. | 455/414.2 |
| 6,259,782 | B1 * | 7/2001 | Gallant | 379/211.01 |
| 6,366,777 | B1 | 4/2002 | Uusitalo | |
| 6,393,275 | B1 * | 5/2002 | Alfred | 455/422.1 |
| 6,449,483 | B1 * | 9/2002 | Akhteruzzaman et al. | 455/445 |
| 6,480,580 | B1 * | 11/2002 | Beswick et al. | 379/88.13 |
| 6,915,136 | B2 * | 7/2005 | Kikuta et al. | 455/461 |
| 2002/0077129 | A1 * | 6/2002 | Kikuta et al. | 455/461 |
| 2003/0060199 | A1 * | 3/2003 | Khalil et al. | 455/435 |
| 2004/0170174 | A1 * | 9/2004 | Marsico et al. | 370/392 |
| 2005/0020308 | A1 * | 1/2005 | Lai | 455/558 |

FOREIGN PATENT DOCUMENTS

| CN | 1314769 A | 9/2001 |
|---|---|---|
| JP | 2001-504666 | 4/2001 |
| JP | 2001-325279 | 11/2001 |

(Continued)

OTHER PUBLICATIONS

Chinese Office Action dated Dec. 8, 2006 with English translation.

(Continued)

Primary Examiner—Vincent P Harper
Assistant Examiner—Mazda Sabouri
(74) Attorney, Agent, or Firm—McGinn IP Law Group, PLLC (57) ABSTRACT In a mobile communication system, a user managing section manages, as user managing information, a user ID of each user in association with a terminal ID of a currently activated one of mobile terminal equipments possessed by the user. Upon activating one of the mobile terminal equipments, the user managing section inactivates the currently activated mobile terminal equipment with reference to the user managing information. The mobile terminal equipment holds not only the terminal ID of the mobile terminal equipment but also the user ID. By notifying the user ID to the mobile communication system, activation and inactivation are controlled. If an input unit receives any user's operation while the mobile terminal equipment is inactivated, reception of the user's operation is informed to the mobile communication system and the mobile terminal equipment is automatically activated.

8 Claims, 6 Drawing Sheets

FOREIGN PATENT DOCUMENTS

| | | |
|---|---|---|
| JP | 2002-324052 | 11/2002 |
| WO | WO 94/08433 | 4/1994 |
| WO | WO 97/25828 | 7/1997 |
| WO | WO 98/24257 | 6/1998 |

OTHER PUBLICATIONS

European Search Report dated May 7, 2007.
Japanese Office Action dated Nov. 5, 2008, with partial English translation.

* cited by examiner

MOBILE COMMUNICATION SYSTEM

This application claims priority to prior Japanese application JP 2003-350840, the disclosure of which is incorporated herein by reference.

BACKGROUND OF THE INVENTION

This invention relates to a mobile communication system, a mobile communication method using the mobile communication system, and a program for making a computer or a microprocessor execute the mobile communication method.

It is to be noted here that "ID" represents "identifier" in the present specification.

Japanese Patent Application Publication (JP-A) No. 2001-325279 discloses a communication data processing terminal equipment comprising a user's own data storage unit which stores a user ID for identifying a user of a mobile terminal. The user ID stored and registered in the user's own data storage unit can be changed. Even in case where a single mobile terminal is used by a plurality of users or in case where a plurality of mobile terminals are used by a single user, it is possible to easily and appropriately manage business card data collected by each individual user.

Japanese Patent Application Publication (JP-A) No. 2002-324052 discloses a wireless terminal authentication method. According to the method, if a first terminal ID extracted from an authentication request packet from a wireless terminal is not coincident with a second terminal ID recorded in a managing table provided in a wireless base station or an authentication server, an authentication reject response is sent to the wireless terminal even if first authentication information extracted from the authentication request packet from the wireless terminal is coincident with second authentication information in the managing table. Therefore, even if authentication information such as a user ID or a password is stolen, it is possible to prevent double access from different wireless terminals.

Traditionally, in case where a user possesses a plurality of mobile terminal equipments, a mobile communication system treats these mobile terminal equipments as completely different and independent terminals. Therefore, even if only one mobile terminal equipment can be used or is used by the user at one time, the mobile communication system must be provided with facilities or resources sufficient to simultaneously handle a total number of mobile terminal equipments for the purpose of information registration to a core network and management. On the other hand, the user must bear costs corresponding to the number of the mobile terminal equipments possessed by the user.

Recently, a mobile terminal equipment supplied from an IC card with terminal information (a terminal ID (identifier) referred to in this invention) is brought into practical use. In this case, it is possible for a user to use a plurality of mobile terminal equipments at a cost for a single subscriber line. However, the IC card must be inserted and removed every time when a mobile terminal equipment to be used is changed from one to another. Thus, the user is required to consciously perform such a troublesome operation.

SUMMARY OF THE INVENTION

It is an object of this invention to provide a mobile communication system which enables a user to use a plurality of mobile terminal equipments by the use of a facility substantially corresponding to a single subscriber line without requiring user's consciousness.

It is another object of this invention to provide a mobile communication method using the above-mentioned mobile communication system.

It is still another object of this invention to provide a program for making a computer or a microprocessor execute the above-mentioned mobile communication method.

According to this invention, there is provided a mobile communication system including a plurality of mobile terminal equipments possessed by a user having a user identifier as a number uniquely assigned to the user, the system comprising:

means for restricting the use of the mobile terminal equipments so that only one of the mobile terminal equipments possessed by the user is allowed to be used at one time, by detecting a user's operation at a particular one of the mobile terminal equipments and informing the user identifier; and means for inactivating an already activated one of the mobile terminal equipments when the particular mobile terminal equipment of the user is activated.

According to this invention, there is also provided a mobile communication system comprising:

at least one mobile terminal equipment possessed by a user, a plurality of base station equipments located at different positions, and a core network connecting the base station equipments to one another and having a function of managing a whole of the mobile communication system;

the mobile terminal equipment being a movable terminal having a function of establishing wireless connection to the base station equipments, the mobile terminal equipment having a terminal identifier specific to the mobile terminal equipment and a user identifier specific to the user;

each of the base station equipments having a position identifier specific thereto and managing wireless communication in an area assigned thereto;

the core network having a position information managing section and a user managing section;

the position information managing section having a position information managing table memorizing, as position managing information, the terminal identifier of the mobile terminal equipment in association with the position identifier of one of the base station equipments which manages wireless communication at a position of the mobile terminal equipment;

the user managing section having a user managing information table memorizing, as user managing information, the user identifier of the user in association with the terminal identifier of the mobile terminal equipment or one of the mobile terminal equipments possessed by the user which is activated at that time instant;

only one mobile terminal equipment being possessed by the user or only one of the mobile terminal equipments possessed by the user being turned on;

the mobile terminal equipment having means for delivering a registration request to one of the base station equipments as a corresponding base station equipment which is present in a corresponding area, together with the terminal identifier and the user identifier held by the mobile terminal equipment;

each of the base station equipments having means for delivering the registration request to the user managing section together with the position identifier of the base station equipment in addition to the terminal identifier and the user identifier delivered thereto;

the user managing section having means for storing the user identifier and the terminal identifier delivered thereto as the user managing information and for delivering the registration request to the position information managing section together with the terminal identifier and the position identifier of the corresponding base station equipment;

the position information managing section having means for storing the terminal identifier and the position identifier delivered thereto as the position managing information and for delivering a registration completion notice to the corresponding base station equipment in order to inform the mobile terminal equipment of completion of all procedures related to information registration;

the base station equipment having means for transferring the registration completion notice to the mobile terminal equipment;

the mobile terminal equipment having means for bringing the mobile terminal equipment into an activated state so that speech communication or data communication is carried out.

According to this invention, there is still also provided a mobile communication method using a mobile communication system including a plurality of mobile terminal equipments possessed by a user having a user identifier as a number uniquely assigned to the user, the method comprising the steps of:

restricting the use of the mobile terminal equipments so that only one of the mobile terminal equipments possessed by the user is allowed to be used at one time, by detecting a user's operation at a particular one of the mobile terminal equipments and informing the user identifier; and inactivating an already activated one of the mobile terminal equipments when the particular mobile terminal equipment of the user is activated.

According to this invention, there is also provided a mobile communication method using a mobile communication system comprising:

at least one mobile terminal equipment possessed by a user, a plurality of base station equipments located at different positions, and a core network connecting the base station equipments to one another and having a function of managing a whole of the mobile communication system;

the mobile terminal equipment being a movable terminal having a function of establishing wireless connection to the base station equipments, the mobile terminal equipment having a terminal identifier specific to the mobile terminal equipment and a user identifier specific to the user;

each of the base station equipments having a position identifier specific thereto and managing wireless communication in an area assigned thereto;

the core network having a position information managing section and a user managing section;

the position information managing section having a position information managing table memorizing, as position managing information, the terminal identifier of the mobile terminal equipment in association with the position identifier of one of the base station equipments which manages wireless communication at a position of the mobile terminal equipment;

the user managing section having a user managing information table memorizing, as user managing information, the user identifier of the user in association with the terminal identifier of the mobile terminal equipment or one of the mobile terminal equipments possessed by the user which is activated at that time instant;

only one mobile terminal equipment being possessed by the user or only one of the mobile terminal equipments possessed by the user being turned on;

the method comprising the steps of:

delivering a registration request from the mobile terminal equipment to one of the base station equipments as a corresponding base station equipment which is present in a corresponding area, together with the terminal identifier and the user identifier held by the mobile terminal equipment;

delivering the registration request from the corresponding base station equipment to the user managing section together with the position identifier of the corresponding base station equipment in addition to the terminal identifier and the user identifier delivered to the corresponding base station equipment;

storing in the user managing section the user identifier and the terminal identifier delivered thereto as the user managing information and delivering the registration request from the user managing section to the position information managing section together with the terminal identifier and the position identifier of the corresponding base station equipment;

storing in the position information managing section the terminal identifier and the position identifier delivered thereto as the position managing information and delivering a registration completion notice from the position information managing section to the corresponding base station equipment in order to inform the mobile terminal equipment of completion of all procedures related to information registration;

transferring the registration completion notice from the base station equipment to the mobile terminal equipment; and bringing the mobile terminal equipment into an activated state so that speech communication or data communication is carried out.

According to this invention, there is also provided a program for making a computer or a microprocessor execute one of the above-mentioned mobile communication methods.

In this invention, a wireless mobile communication system including a mobile terminal equipment, such as a mobile telephone, is characterized by the following. In case where a user possesses a plurality of mobile terminal equipments, (1) only a particular one of the mobile terminal equipments which is activated by the user is put into a communicable state while the remaining mobile terminal equipments are automatically inactivated and (2) the particular mobile terminal equipment is automatically activated by detecting a user's operation upon the particular mobile terminal equipment without requiring an explicit and special terminal activating operation by the user.

The mobile communication system according to this invention is different from an existing mobile communication system in that a user managing section is provided in order to manage, as user managing information, a user ID uniquely assigned to a user and a terminal ID of one of the mobile terminal equipments possessed by the user which is currently activated. When a particular mobile terminal equipment is activated, the particular mobile terminal equipment communicates with the user managing section. If any other mobile terminal equipment is already activated, the other mobile terminal equipment is inactivated according to the user managing information in the user managing section.

The mobile terminal equipment belonging to the mobile communication system in this invention holds not only the terminal ID (equivalent to that of the existing system) for identifying the mobile terminal equipment but also the user ID within the mobile terminal equipment. By informing the user ID to the mobile communication system, activation and inactivation are controlled.

The mobile terminal equipment has a communicating section for actually processing communication. The communicating section is connected through a control section to an input unit. In case where the input unit receives any user's operation while the mobile terminal equipment is inactivated, the communicating section informs the mobile communication system of reception of the user's operation to automatically activate the mobile terminal equipment.

Thus, according to this invention, only one mobile terminal equipment among a plurality of mobile terminal equipments possessed by a user is activated at one time. Further, switching between activation and inactivation is automatically carried out by detecting a user's operation without requiring an explicit and special activating or inactivating operation by the user. Therefore, even if a plurality of mobile terminal equipments are possessed by the user, it is possible to suppress the cost of the mobile communication system and to use the mobile terminal equipments without being conscious of control for activation and inactivation.

As described above, this invention has following effects.

First Effect

Since only one of a plurality of mobile terminal equipments possessed by a user is activated while the remaining mobile terminal equipments are inactivated and do not use a facility of a core network, it is possible to suppress facility consumption per user to a level substantially equivalent to that when the user possesses only one mobile terminal equipment. Thus, the cost of the mobile communication system can be suppressed low and the cost borne by the user can be suppressed low.

Second Effect

By activating the mobile terminal equipment upon detection of a user's operation and by inactivating the mobile terminal equipment in response to a notice from the core network in case where any other terminal equipment is activated, an activated state and an inactivated state can automatically be switched without requiring a special operation of the user. Upon starting communication, some user's operation is often carried out upon the mobile terminal equipment prior to actual communication. By detecting such user's operation and activating the mobile terminal equipment, it is expected that the mobile terminal equipment is activated and put into a usable or communicable state before the actual communication is started. Thus, the user can use the mobile terminal equipment without being conscious of switching between activation and inactivation.

Third Effect

As a subsidiary effect of the first and the second effects, it is possible without user's consciousness to suppress current consumption for a mobile terminal equipment less frequently used, since any mobile terminal equipment which is not used by a user is automatically inactivated. This is because, in an inactivated state, the communicating section is completely stopped so that current consumption at the communicating section is equal to zero.

BRIEF DESCRIPTION OF THE DRAWINGS

FIG. 3 is a schematic block diagram similar to FIG. 1 for describing an operation in case where a user possesses only one mobile terminal equipment or in case where only one of a plurality of mobile terminal equipments possessed by the user is turned on;

DESCRIPTION OF THE PREFERRED EMBODIMENT

Now, this invention will be described in detail with reference to the drawing.

Figure 1:
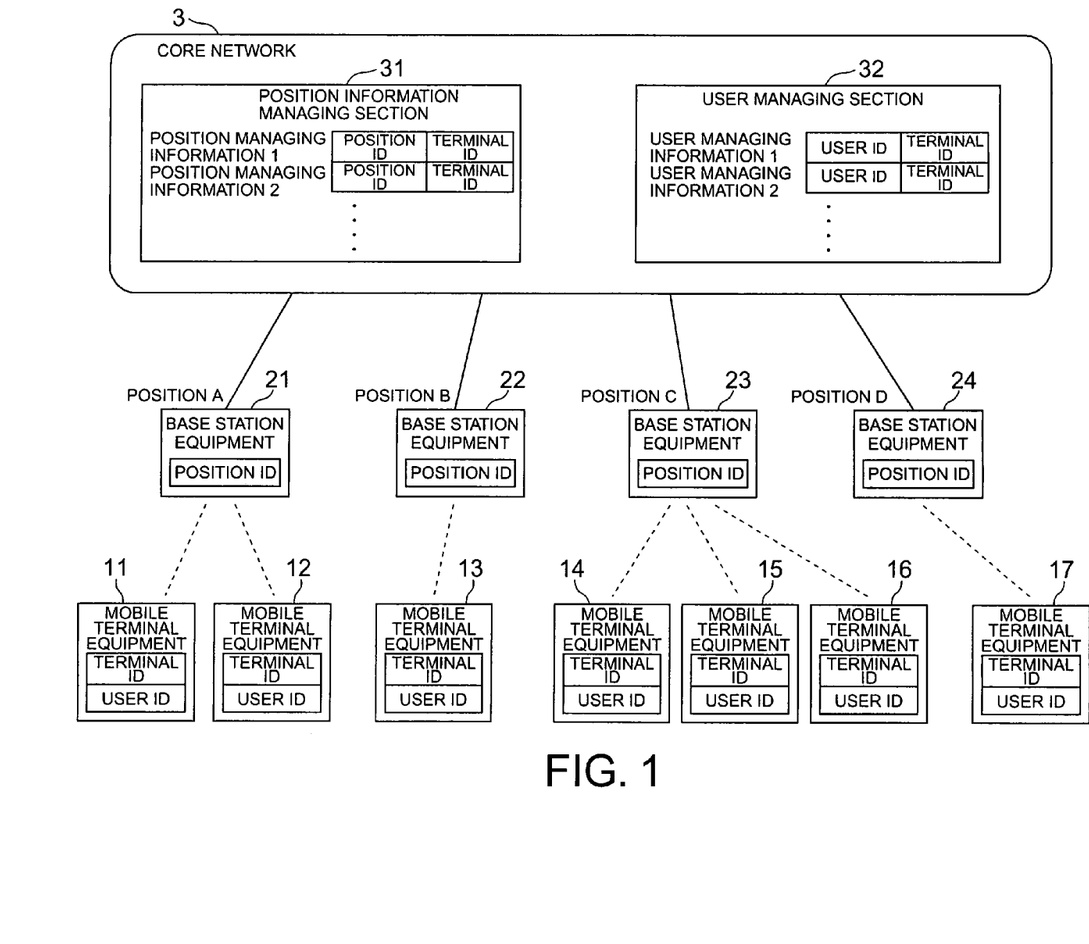
FIG. 1 is a schematic block diagram showing a whole of a mobile communication system according to an embodiment of this invention.

Referring to FIG. 1, a mobile communication system according to an embodiment of this invention includes a plurality of mobile terminal equipments 11 through 17, a plurality of base station equipments 21 through 24 located at different positions, and a core network 3 connecting the base station equipments 21 through 24 to one another and having a function of managing a whole of the mobile communication system.

In the mobile communication system of this invention, a user who possesses at least one of the mobile terminal equipments 11 through 17 is assigned with a user ID as a unique number specific to the user. When a user's operation is detected at a particular one of the mobile terminal equipments 11 through 17, the user ID is informed to the core network 3 in order to restrict the use of the mobile terminal equipments so that only one of the mobile terminal equipments possessed by the user can be used at one time. In case where a particular one of the mobile terminal equipments possessed by the user is activated, any other mobile terminal equipment already activated is inactivated.

Each of the mobile terminal equipments 11 through 17 may be a so-called mobile telephone, a data communication card, or the like and is a movable terminal having a function of establishing wireless connection to the mobile communication system. Each of the mobile terminal equipments 11 through 17 has a terminal ID which is a number uniquely assigned to each mobile terminal equipment and a user ID which is a number uniquely assigned to each user. In case of a mobile telephone network, the user ID may be a telephone number. The terminal ID and the user ID may be recorded within the mobile terminal equipment or may be recorded in an external recording apparatus, such as an IC card, connected to the mobile terminal equipment. Each individual terminal ID is assigned to only one mobile terminal equipment. On the other hand, each individual user ID may be assigned to a plurality of mobile terminal equipments. The structure of the mobile terminal equipments 11 through 17 will later be described in detail with reference to FIG. 2.

The base station equipments 21 through 24 are installed per area or per building. Each of the base station equipments 21 through 24 has a position ID specific thereto and controls and manages wireless communication in an area or a building assigned thereto. Each of the base station equipments 21 through 24 is similar in basic structure to that in an existing mobile telephone network and can easily be implemented.

The core network 3 does not mean a single apparatus but means an entire system having an interconnecting function of connecting the base station equipments 21 through 24 to one another and a managing function of managing user information, accounting information, and so on. In this invention, the core network 3 essentially has a position information managing section 31 and a user managing section 32. The remaining part of the core network 3 except the position information managing section 31 and the user managing section 32 is similar to that of the existing mobile telephone network and will not be described herein.

The position information managing section 31 has a position managing information table. The position managing information table memorizes, as position managing information, the terminal ID of each mobile terminal equipment in association with the position ID of one of the base station equipments which manages wireless communication at a position of the mobile terminal equipment. The position managing information is used to search and retrieve the position ID from the terminal ID.

The user managing section 32 has a user managing information table. The user managing information table memorizes, as user managing information, the user ID of each user in association with the terminal ID of one of the mobile terminal equipments possessed by the user which is activated at that time instant. The mobile terminal equipments possessed by the same user have the same user ID. The user managing information is only one for each individual user ID. In other words, a plurality of user managing information are not present for each individual user ID. The user managing information is used to search and retrieve the terminal ID from the user ID.

Figure 2:
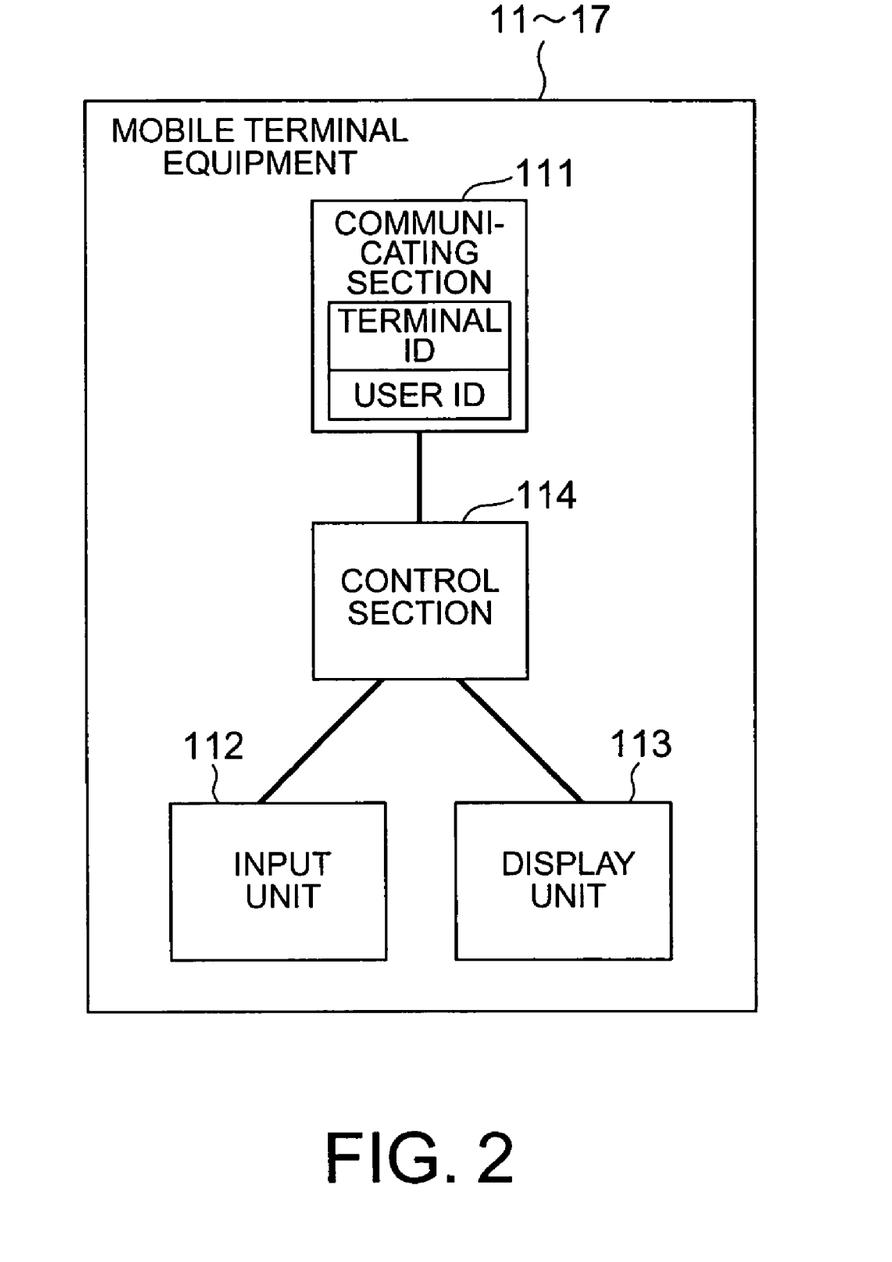
FIG. 2 is a schematic block diagram showing a mobile terminal equipment.

Referring to FIG. 2, each of the mobile terminal equipments 11 through 17 comprises a communicating section 111, an input unit 112, a display unit 113, and a control section 114.

The communicating section 111 serves to process wireless communication with the base station equipments 21 through 24. The communicating section 111 holds the terminal ID and the user ID (or duplicate copies of these values) and has a function of transmitting values of the terminal ID and the user ID through the base station equipments 21 through 24 to the core network 3 if necessary. The communicating section 111 further has an inactivating function of stopping communication in response to an instruction from the control section 114.

The input unit 112 serves to receive a key operation by the user.

The display unit 113 has a function of displaying an activated/inactivated state of the mobile terminal equipment and various conditions related to wireless communication, such as an electric wave intensity and a communicating condition. The display unit 113 may be equipped within each of the mobile terminal equipments 11 through 17 or may be an external unit connected thereto. Sometimes, the mobile terminal equipments 11 through 17 may not have the display unit 113. In case where each of the mobile terminal equipments 11 through 17 has the display unit 113, it is desired to continuously display basic conditions related to wireless communication, such as the electric wave intensity, even if the activated/inactivated state is changed. This is because, if the basic conditions related to wireless communication can not be confirmed, it is impossible to know whether or not each of the mobile terminal equipments 11 through 17 is usable.

The control section 114 serves to control those components of each of the mobile terminal equipments 11 through 17.

The basic components of the mobile terminal equipments 11 through 17 are equivalent to those of existing mobile telephones and can easily be implemented.

When each of the mobile terminal equipments 11 through 17 in this invention is turned on, information registration to the core network 3 is carried out. Further, if any user's operation at the input unit 112 is detected while the communicating section 111 is inactivated, information registration to the core network 3 is carried out again to re-activate the communicating section 111.

For example, the user's operation to trigger the re-activation may be a key input operation, an antenna stretching operation, a cover opening operation, or a cable inserting operation.

Next referring to FIGS. 3 through 6, operations of this embodiment will be described.

Figure 3:
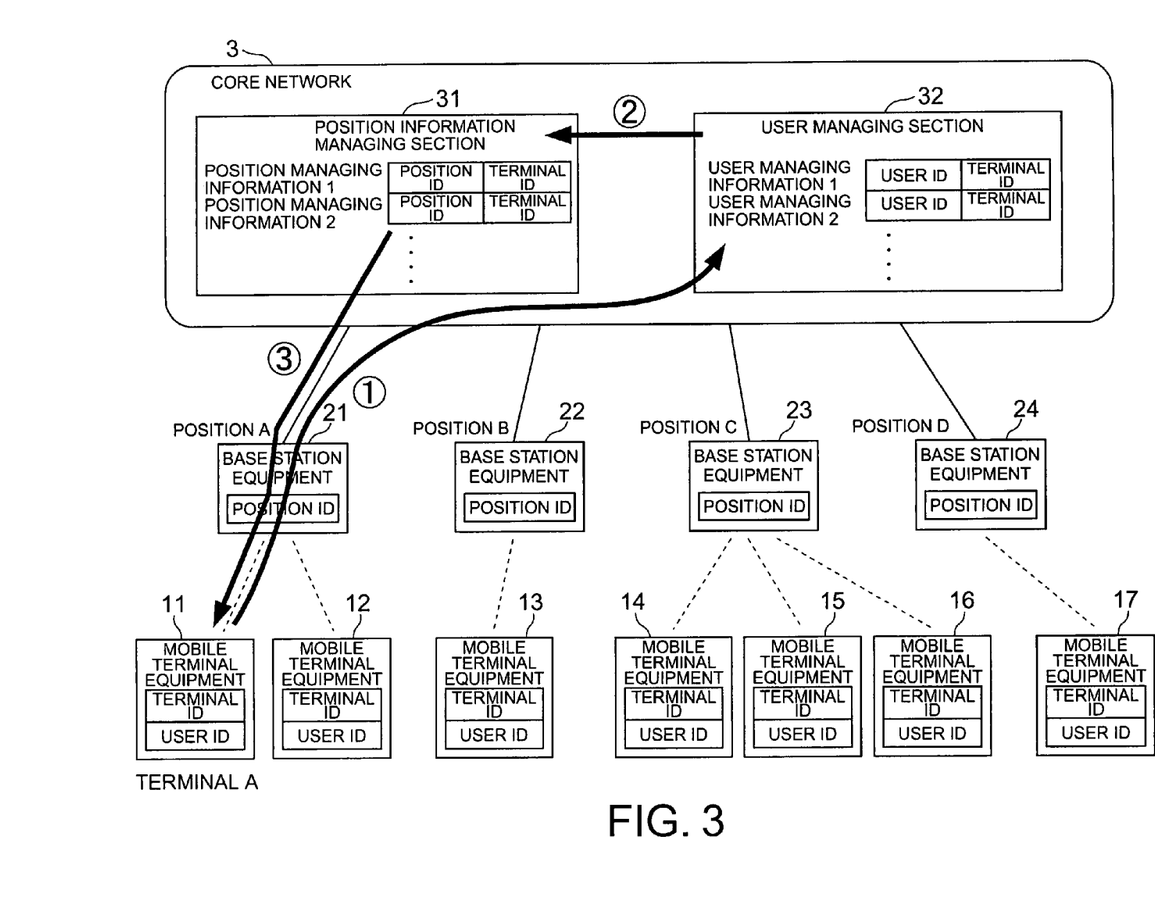
Figure 4:
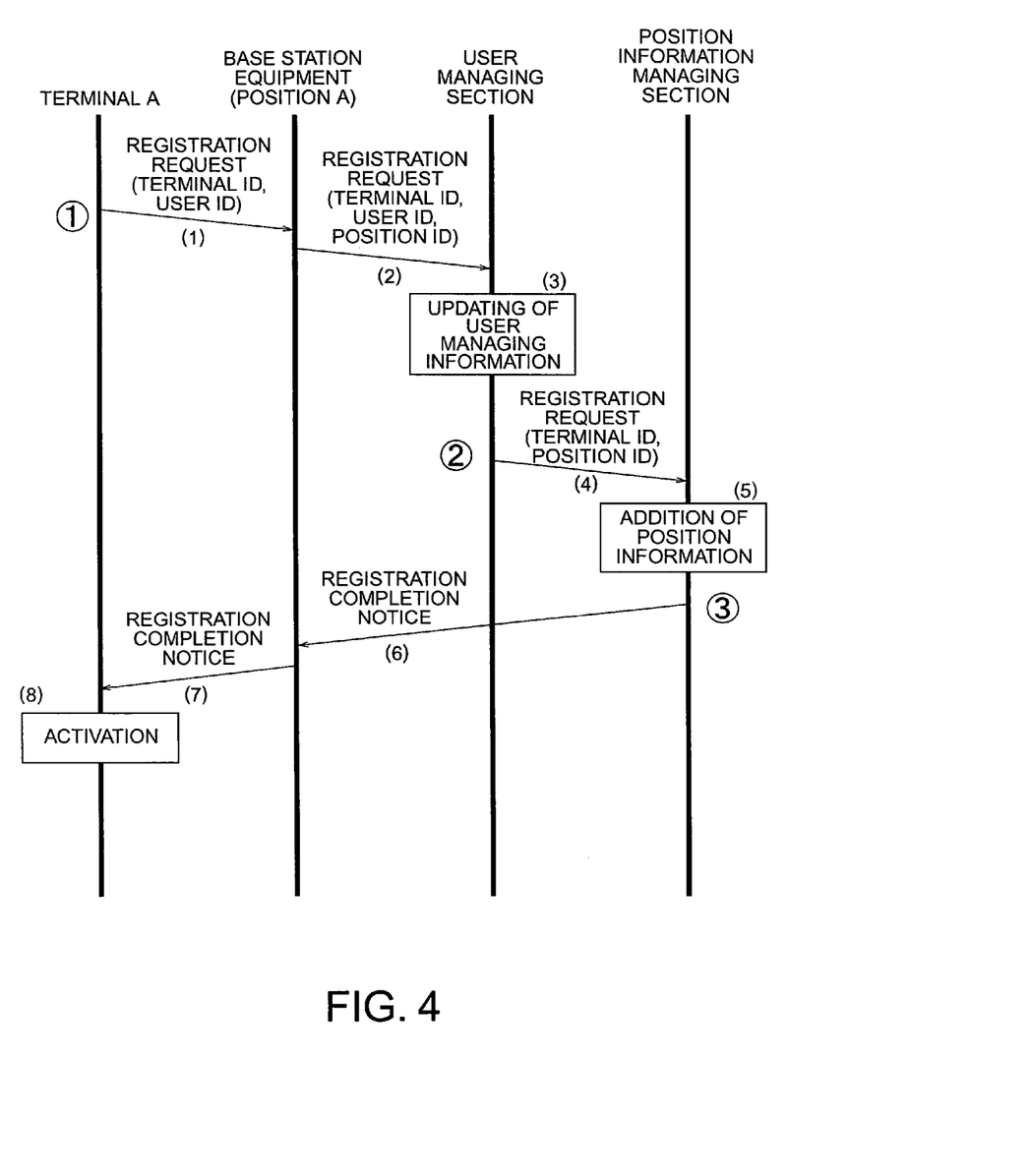
FIG. 4 is a sequence chart for describing the operation in FIG. 3.

Referring to FIGS. 3 and 4, description will be made of the operation in case where a user possesses only one mobile terminal equipment or only one of a plurality of mobile terminal equipments possessed by the user is turned on.

In case where a terminal A as a mobile terminal equipment 11 is turned on, information registration to the core network 3 is carried out in the following manner to activate the terminal A. When the mobile terminal equipment is activated, the mobile terminal equipment is allowed to carry out communication, such as speech communication or data communication. In case where only one mobile terminal equipment is possessed by the user, the mobile terminal equipment is not inactivated.

(1) The terminal A delivers a registration request to the base station equipment 21 present in a corresponding area (herein, located at a position A), together with the terminal ID and the user ID.

(2) The base station equipment 21 delivers the registration request to the user managing section 32 together with the position ID of the base station equipment 21, in addition to the terminal ID and the user ID delivered thereto in the step (2).

(3) Since the user has only one terminal A, no user managing information corresponding to the user ID of the terminal A is present in the user managing information table in the user managing section 32 at this time instant. In this event, the user managing section 32 stores the user ID and the terminal ID delivered thereto as user managing information.

(4) The user managing section 32 delivers the registration request to the position information managing section 31, together with the terminal ID of the terminal A and the position ID of the base station equipment 21.

(5) The position information managing section 31 stores the terminal ID and the position ID delivered thereto in the step (4) as position managing information.

(6) The position information managing section 31 delivers a registration completion notice to the base station equipment 21 in order to inform the terminal A of completion of all procedures related to the information registration.

(7) The base station equipment 21 transfers the registration completion notice to the terminal A.

(8) The terminal A is activated and enabled to carry out communication such as speech communication or data communication.

Next referring to FIGS. 5 and 6, description will be made of the operation in case where a user has a mobile terminal equipment already activated and is going to activate another mobile terminal equipment possessed by the user. In this case, the mobile terminal equipment already activated is inactivated in the process of activating another mobile terminal equipment. As a result, only one of the mobile terminal equipments possessed by the same user is activated at one time.

Figure 5:
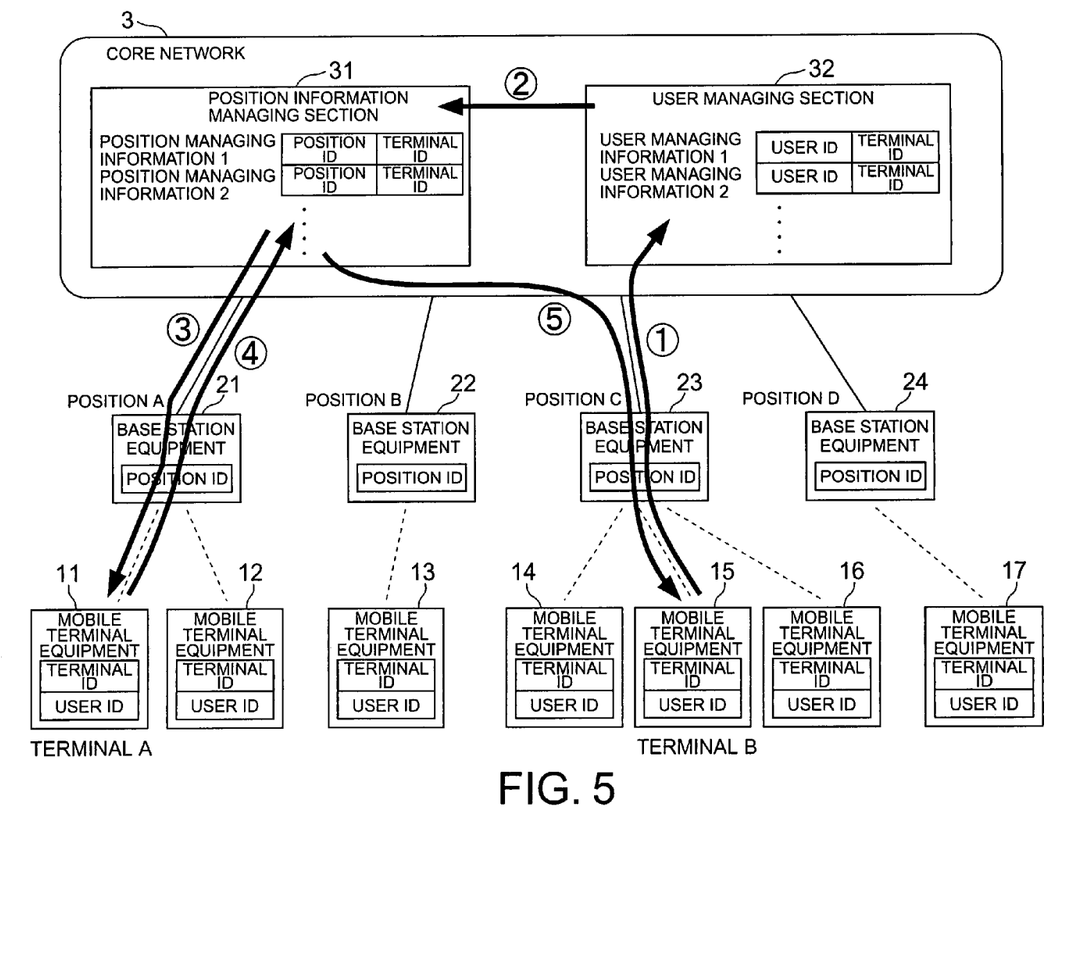
FIG. 5 is a schematic block diagram similar to FIG. 1 for describing an operation in case where a mobile terminal equipment possessed by a user is already activated and another mobile terminal equipment possessed by the user is going to be activated.
Figure 6:
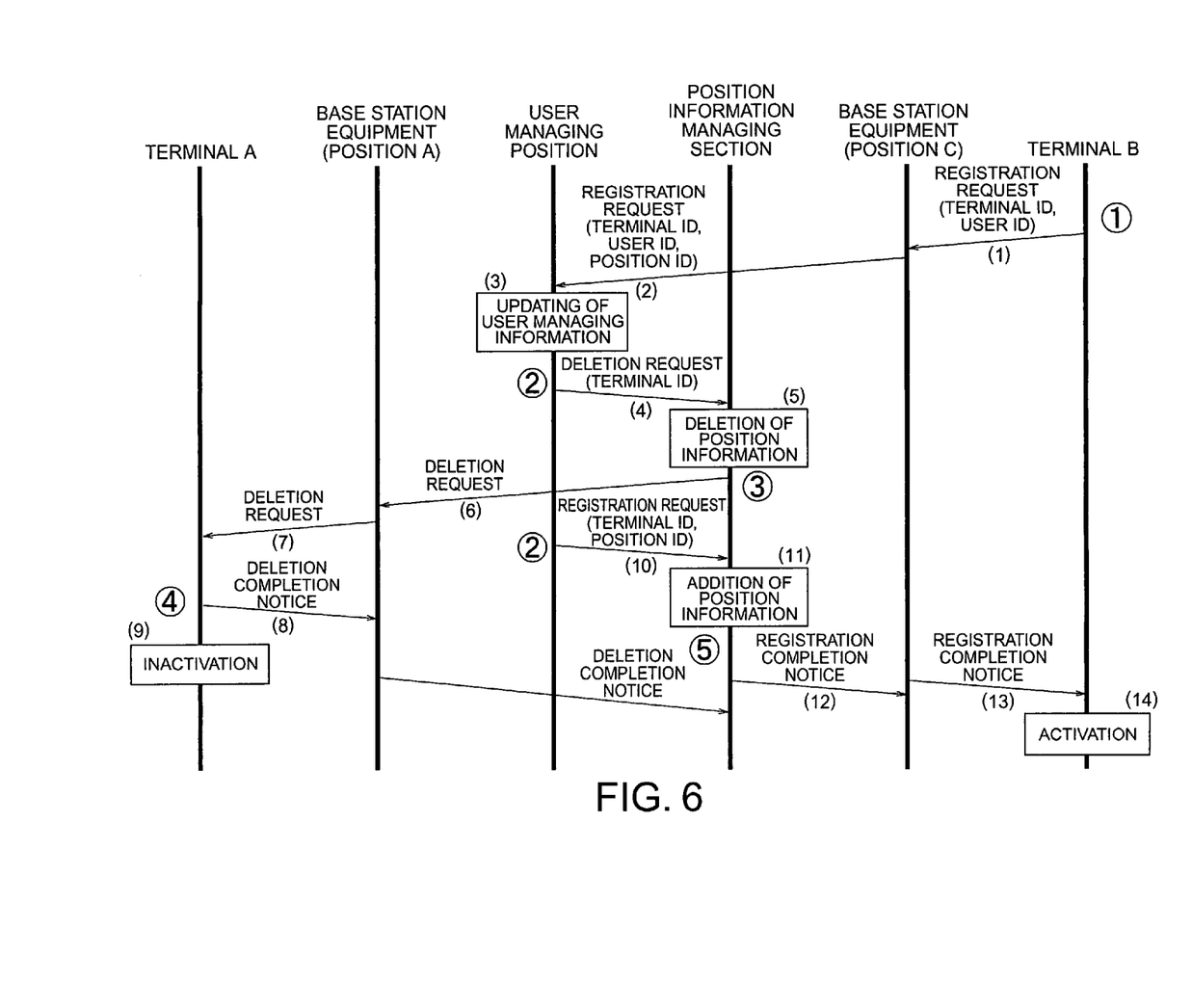
FIG. 6 is a sequence chart for describing the operation in FIG. 5.

In FIGS. 5 and 6, a terminal A is the mobile terminal equipment already activated. A terminal B is the mobile terminal equipment which is going to be activated. In the figures, the terminal A is present in an area assigned to the base station equipment 21 located at a position A while the terminal B is present in another area assigned to the base station equipment 23 located at a position C. However, the terminals A and B may be present within the same area.

The terminal B is activated and the terminal A is inactivated through the following steps.

(1) The terminal B delivers a registration request to the base station equipment 23 present in a corresponding area (herein, located at the position C), together with the terminal ID and the user ID.

(2) The base station equipment 23 delivers the registration request to the user managing section 32 together with the position ID of the base station equipment 23, in addition to the terminal ID and the user ID delivered thereto in the step (1).

(3) The user managing section 32 searches whether or not the user ID delivered thereto is already registered and, since the user ID is already registered, extracts user managing information of the user having the user ID. Herein, the user managing information including the user ID associated with the terminal ID of the terminal A is extracted.

Thus, the user managing information corresponding to the user ID is already present. In this event, the terminal ID of the user managing information is rewritten from that of the terminal A into that of the terminal B. Thus, the user managing information is updated and stored.

(4) The user managing section 32 delivers an information deletion request to the position information managing section 31, together with the terminal ID of the terminal A, in order to delete the position managing information of the terminal A already registered.

(5) The position information managing section 31 searches and retrieves the position managing information corresponding to the terminal ID delivered thereto in the step (4) and deletes the position managing information after the position ID corresponding to the terminal ID is extracted therefrom.

(6) In order to inform the terminal A of deletion of information, the position information managing section 31 extracts the position ID from the position managing information retrieved in the step (5) and delivers a deletion request to the base station equipment 21 (herein, located at the position A).

(7) The base station equipment 21 transfers the deletion request to the terminal A.

(8) The terminal A delivers a deletion completion notice to the base station equipment 21 in order to inform the core network 3 that the deletion request has been received and the terminal A is being inactivated.

(9) After delivery of the deletion completion notice in the step (8), the terminal A stops the communicating section 111 and is inactivated until a next user's operation is detected.

(10) Since the terminal B is newly registered in the step (3), the user managing section 32 delivers a registration request for the terminal B to the position information managing section 31, together with the terminal ID of the terminal B and the position ID of the base station equipment 23.

(11) The position information managing section 31 stores the terminal ID and the position ID delivered thereto in the step (10) as position managing information.

(12) The position information managing section 31 delivers a registration completion notice to the base station equipment 23 in order to inform the terminal B of completion of all procedures related to information registration.

(13) The base station equipment 23 transfers the registration completion notice to the terminal B.

(14) The terminal B is activated and enabled to carry out communication such as speech communication or data communication.

By the use of a program programming a mobile communication method using the mobile communication system according to the foregoing embodiment, it is possible to make a computer or a microprocessor execute the mobile communication method.

While this invention has thus far been described in conjunction with the preferred embodiment thereof, it will be readily possible for those skilled in the art to put this invention into practice in various other manners without departing the scope of this invention.

What is claimed is:

1. A mobile communication system comprising:
at least one mobile terminal equipment possessed by a user, a plurality of base station equipments located at different positions, and a core network connecting said base station equipments to one another and having a function of managing a whole of said mobile communication system;
said mobile terminal equipment being a movable terminal having a function of establishing wireless connection to said base station equipments, said mobile terminal equipment having a terminal identifier specific to said mobile terminal equipment and a user identifier specific to the user;
each of said base station equipments having a position identifier specific thereto and managing wireless communication in an area assigned thereto;
said core network having a position information managing section and a user managing section;
said position information managing section having a position information managing table memorizing, as position managing information, said terminal identifier of the mobile terminal equipment in association with said position identifier of one of said base station equipments which manages wireless communication at a position of said mobile terminal equipment;
said user managing section having a user managing information table memorizing, as user managing information, said user identifier of the user in association with said terminal identifier of only said mobile terminal equipment possessed by the user which is activated at that time instant;
only one mobile terminal equipment being possessed by the user being turned on;
said mobile terminal equipment having means for delivering a registration request to one of said base station equipments as a corresponding base station equipment which is present in a corresponding area, together with the terminal identifier and the user identifier held by said mobile terminal equipment;
each of said base station equipments having means for delivering the registration request to said user managing section together with the position identifier of the base station equipment in addition to the terminal identifier and the user identifier delivered thereto;
said user managing section having means for storing the user identifier and the terminal identifier delivered thereto as the user managing information and for delivering the registration request to said position information managing section together with the terminal identifier and the position identifier of the corresponding base station equipment;
said position information managing section having means for storing the terminal identifier and the position identifier delivered thereto as the position managing information and for delivering a registration completion notice to the corresponding base station equipment in order to inform said mobile terminal equipment of completion of all procedures related to information registration;

said base station equipment having means for transferring the registration completion notice to said mobile terminal equipment;
said mobile terminal equipment having means for bringing said mobile terminal equipment into an activated state so that speech communication or data communication is carried out, wherein:
  a first mobile terminal equipment possessed by a particular user and present in a first area is already activated while a second mobile terminal equipment possessed by the particular user and present in a second area is going to be activated;
  said first and said second mobile terminal equipments having first and second terminal identifiers specific thereto, respectively;
  said first and said second areas being managed by first and second base station equipments having first and second position identifiers, respectively;
  said second mobile terminal equipment having means for delivering a registration request to said second base station equipment together with the second terminal identifier assigned to said second mobile terminal equipment and a user identifier assigned to the particular user;
  said second base station equipment having means for delivering the registration request to said user managing section together with the second position identifier of said second base station equipment, in addition to the second terminal identifier and the user identifier delivered to said second base station equipment;
  said user managing section having means for searching whether or not the user identifier delivered thereto is already registered, extracting the user managing information corresponding to the user identifier and associated with the first terminal identifier of said first mobile terminal equipment, rewriting the user managing information by replacing the first terminal identifier by the second terminal identifier delivered to said user managing section and storing the user managing information thus rewritten, and delivering an information deletion request to said position information managing section together with the first terminal identifier in order to request deletion of the position managing information for the first mobile terminal equipment;
  said position information managing section having means for searching the position managing information corresponding to the first terminal identifier delivered thereto, extracting the first position identifier and deleting the position managing information, and delivering a deletion request to said first base station equipment corresponding to the first position identifier;
  said first base station equipment having means for transferring the deletion request to said first mobile terminal equipment;
  said first mobile terminal equipment having means for delivering a deletion completion notice in order to inform said core network of reception of the deletion request and of switching into an inactivated state and for bringing said first mobile terminal equipment into the inactivated state;
  said user managing section having means for storing the user identifier and the second terminal identifier delivered thereto as the user managing information and for delivering a registration request to said position information managing section together with the second terminal identifier and the second position identifier of said second base station equipment;
  said position information managing section having means for storing the second terminal identifier and the second position identifier delivered thereto as the position managing information and for delivering a registration completion notice to said second base station equipment in order to inform said second mobile terminal equipment of completion of all procedures related to information registration;
  said second base station equipment having means for transferring the registration completion notice to said second mobile terminal equipment;
  said second mobile terminal equipment having means for bringing said second mobile terminal equipment into an activated state so that speech communication or data communication is carried out.

2. A mobile communication method using a mobile communication system including at least one mobile terminal equipment possessed by a user, a plurality of base station equipments located at different positions, and a core network connecting said base station equipments to one another and having a function of managing a whole of said mobile communication system, said mobile terminal equipment being a movable terminal having a function of establishing wireless connection to said base station equipments, said mobile terminal equipment having a terminal identifier specific to said mobile terminal equipment and a user identifier specific to the user, each of said base station equipments having a position identifier specific thereto and managing wireless communication in an area assigned thereto, said core network having a position information managing section and a user managing section, said position information managing section having a position information managing table memorizing, as position managing information, said terminal identifier of the mobile terminal equipment in association with said position identifier of one of said base station equipments which manages wireless communication at a position of said mobile terminal equipment, said user managing section having a user managing information table memorizing, as user managing information, said user identifier of the user in association with said terminal identifier of said mobile terminal equipment or one of said mobile terminal equipments possessed by the user which is activated at that time instant, only one mobile terminal equipment being possessed by the user or only one of said mobile terminal equipments possessed by the user being turned on, said method comprising:
  delivering a registration request from said mobile terminal equipment to one of said base station equipments as a corresponding base station equipment which is present in a corresponding area, together with the terminal identifier and the user identifier held by said mobile terminal equipment;
  delivering the registration request from the corresponding base station equipment to said user managing section together with the position identifier of the corresponding base station equipment in addition to the terminal identifier and the user identifier delivered to the corresponding base station equipment;
  storing in said user managing section the user identifier and the terminal identifier delivered thereto as the only user managing information and delivering the registration request from said user managing section to said position information managing section together with the terminal identifier and the position identifier of the corresponding base station equipment;
  storing in said position information managing section the terminal identifier and the position identifier delivered thereto as the position managing information and delivering a registration completion notice from said position information managing section to the corresponding base station equipment in order to inform said mobile terminal equipment of completion of all procedures related to information registration;

transferring the registration completion notice from said base station equipment to said mobile terminal equipment; and bringing said mobile terminal equipment into an activated state so that speech communication or data communication is carried out, wherein a first mobile terminal equipment possessed by a particular user and present in a first area is already activated while a second mobile terminal equipment possessed by the particular user and present in a second area is going to be activated, said first and said second mobile terminal equipments having first and second terminal identifiers specific thereto, respectively, said first and said second areas being managed by first and second base station equipments having first and second position identifiers, respectively, said method comprising:

delivering a registration request from said second mobile terminal equipment to said second base station equipment together with the second terminal identifier assigned to said second mobile terminal equipment and a user identifier assigned to the particular user;

delivering the registration request from said second base station equipment to said user managing section together with the second position identifier of said second base station equipment, in addition to the second terminal identifier and the user identifier delivered to said second base station equipment;

searching, by said user managing section, whether or not the user identifier delivered thereto is already registered, extracting the user managing information corresponding to the user identifier and associated with the first terminal identifier of said first mobile terminal equipment, rewriting the user managing information by replacing the first terminal identifier by the second terminal identifier delivered to said user managing section and storing the user managing information thus rewritten, and delivering an information deletion request from said user managing section to said position information managing section together with the first terminal identifier in order to request deletion of the position managing information for the first mobile terminal equipment;

searching, by said position information managing section, the position managing information corresponding to the first terminal identifier delivered thereto, extracting the first position identifier and deleting the position managing information, and delivering a deletion request from said position information managing section to said first base station equipment corresponding to the first position identifier;

transferring the deletion request from said first base station equipment to said first mobile terminal equipment;

delivering a deletion completion notice from said first mobile terminal equipment in order to inform said core network of reception of the deletion request and of switching into an inactivated state and bringing said first mobile terminal equipment into the inactivated state;

storing, in said user managing section, the user identifier and the second terminal identifier delivered to said user managing section as the user managing information and delivering a registration request from said user managing section to said position information managing section together with the second terminal identifier and the second position identifier of said second base station equipment;

storing, in said position information managing section, the second terminal identifier and the second position identifier delivered thereto as the position managing information and delivering a registration completion notice from said position information managing section to said second base station equipment in order to inform said second mobile terminal equipment of completion of all procedures related to information registration;

transferring the registration completion notice from said second base station equipment to said second mobile terminal equipment;

bringing said second mobile terminal equipment into an activated state so that speech communication or data communication is carried out.

3. A mobile communication method claimed in claim 2, wherein said mobile terminal equipment comprises a communicating section, an input unit, a display unit, and a control section, said communicating section serving to process wireless communication between said mobile terminal equipment and said base station equipments, holding the terminal identifier and the user identifier, having a function of delivering values of the terminal identifier and the user identifier through said base station equipments to said core network if necessary, and having an inactivating function of stopping communication in response to an instruction from said control section, said input unit serving to receive a key operation by a user, said display unit having a function of displaying an activated/inactivated state of said mobile terminal equipment and various conditions related to wireless communication, said control section serving to control said communicating section, said input unit, and said display unit of said mobile terminal equipment, the method comprising:

carrying out information registration to said core network from said mobile terminal equipment when it is turned on and, if said input unit detects any user's operation while said communicating section is inactivated, again carrying out information registration to said core network to re-activate said communicating section.

4. A computer-readable medium tangibly embodying a program of machine-readable instructions for making a computer or a microprocessor execute a mobile communication method claimed in claim 2.

5. A mobile communication system comprising:

at least one mobile terminal equipment possessed by a user, a plurality of base station equipments located at different positions, and a core network connecting said base station equipments to one another and having a function of managing a whole of said mobile communication system;

said mobile terminal equipment being a movable terminal having a function of establishing wireless connection to said base station equipments, said mobile terminal equipment having a terminal identifier specific to said mobile terminal equipment and a user identifier specific to the user;

each of said base station equipments having a position identifier specific thereto and managing wireless communication in an area assigned thereto;

said core network having a position information managing section and a user managing section;

said position information managing section having a position information managing table memorizing, as position managing information, said terminal identifier of the mobile terminal equipment in association with said position identifier of one of said base station equipments which manages wireless communication at a position of said mobile terminal equipment;

said user managing section having a user managing information table memorizing, as user managing information, said user identifier of the user in association with said terminal identifier of only said mobile terminal equipment possessed by the user which is activated at that time instant;

only one mobile terminal equipment being possessed by the user being turned on;

said mobile terminal equipment having means for delivering a registration request to one of said base station equipments as a corresponding base station equipment which is present in a corresponding area, together with the terminal identifier and the user identifier held by said mobile terminal equipment;

each of said base station equipments having means for delivering the registration request to said user managing section together with the position identifier of the base station equipment in addition to the terminal identifier and the user identifier delivered thereto;

said user managing section having means for storing the user identifier and the terminal identifier delivered thereto as the user managing information and for delivering the registration request to said position information managing section together with the terminal identifier and the position identifier of the corresponding base station equipment;

said position information managing section having means for storing the terminal identifier and the position identifier delivered thereto as the position managing information and for delivering a registration completion notice to the corresponding base station equipment in order to inform said mobile terminal equipment of completion of all procedures related to information registration;

said base station equipment having means for transferring the registration completion notice to said mobile terminal equipment;

said mobile terminal equipment having means for bringing said mobile terminal equipment into an activated state so that speech communication or data communication is carried out, wherein a first mobile terminal equipment possessed by a particular user and present in a first area is already activated while a second mobile terminal equipment possessed by the particular user and present in a second area is going to be activated, wherein said first and said second mobile terminal equipments include first and second terminal identifiers specific thereto, respectively, wherein said first and said second areas are managed by first and second base station equipments having first and second position identifiers, respectively, wherein said second mobile terminal equipment includes means for delivering a registration request to said second base station equipment together with the second terminal identifier assigned to said second mobile terminal equipment and a user identifier assigned to the particular user, wherein said second base station equipment includes means for delivering the registration request to said user managing section together with the second position identifier of said second base station equipment, in addition to the second terminal identifier and the user identifier delivered to said second base station equipment, and wherein said user managing section includes means for searching whether the user identifier delivered thereto is already registered, extracting the user managing information corresponding to the user identifier and associated with the first terminal identifier of said first mobile terminal equipment, rewriting the user managing information by replacing the first terminal identifier by the second terminal identifier delivered to said user managing section and storing the user managing information thus rewritten, and delivering an information deletion request to said position information managing section together with the first terminal identifier in order to request deletion of the position managing information for the first mobile terminal equipment.

6. The mobile communication system according to claim 5, wherein said position information managing section includes means for searching the position managing information corresponding to the first terminal identifier delivered thereto, extracting the first position identifier and deleting the position managing information, and delivering a deletion request to said first base station equipment corresponding to the first position identifier.

7. The mobile communication system according to claim 6, wherein said first base station equipment includes means for transferring the deletion request to said first mobile terminal equipment, and wherein said first mobile terminal equipment includes means for delivering a deletion completion notice in order to inform said core network of reception of the deletion request and of switching into an inactivated state and for bringing said first mobile terminal equipment into the inactivated state.

8. The mobile communication system according to claim 5, wherein said user managing section includes means for storing the user identifier and the second terminal identifier delivered thereto as the user managing information and for delivering a registration request to said position information managing section together with the second terminal identifier and the second position identifier of said second base station equipment, and wherein said position information managing section includes means for storing the second terminal identifier and the second position identifier delivered thereto as the position managing information and for delivering a registration completion notice to said second base station equipment in order to inform said second mobile terminal equipment of completion of all procedures related to information registration.

* * * * *